US012023890B2

(12) United States Patent
Walsh et al.

(10) Patent No.: US 12,023,890 B2
(45) Date of Patent: Jul. 2, 2024

(54) METHOD AND SYSTEM FOR MANUFACTURING BAGS

(71) Applicant: Graphic Packaging International, Inc., Atlanta, GA (US)

(72) Inventors: Joseph C. Walsh, Boulder, CO (US); Jeffrey T. Sloat, Broomfield, CO (US)

(73) Assignee: Graphic Packaging International, LLC, Atlanta, GA (US)

(*) Notice: Subject to any disclaimer, the term of this patent is extended or adjusted under 35 U.S.C. 154(b) by 794 days.

(21) Appl. No.: 15/795,926

(22) Filed: Oct. 27, 2017

(65) Prior Publication Data

US 2018/0050511 A1 Feb. 22, 2018

Related U.S. Application Data

(62) Division of application No. 13/826,130, filed on Mar. 14, 2013, now Pat. No. 9,844,920.

(Continued)

(51) Int. Cl.

*B31B 70/00* (2017.01)
*B31B 70/16* (2017.01)

(Continued)

(52) U.S. Cl.

CPC ............ *B31B 70/008* (2017.08); *B31B 70/16* (2017.08); *B31B 70/81* (2017.08); *B65D 33/007* (2013.01);

(Continued)

(58) Field of Classification Search

CPC ... B31B 70/81; B31B 70/16; B31B 2150/002; B31B 2155/00; B31B 70/008;

(Continued)

(56) References Cited

U.S. PATENT DOCUMENTS 2,095,910 A 10/1937 Bergstein
2,099,257 A * 11/1937 Bergstein ............ B65D 5/4204 229/117.32

(Continued)

FOREIGN PATENT DOCUMENTS

CA 2384311 3/2001
EP 1 072 526 1/2001

(Continued)

OTHER PUBLICATIONS

Supplementary Partial European Search Report for EP 13 85 1512 dated Aug. 2, 2016.

(Continued)

*Primary Examiner* — Sameh Tawfik

(74) *Attorney, Agent, or Firm* — Womble Bond Dickinson (US) LLP

(57) ABSTRACT

A system and method of manufacturing reinforced bags having reinforcing elements applied about the bags to support the bags in an opened and/or upstanding configuration. A web of bag material can be fed from a supply and can be folded and secured to form the bags. A series of reinforcing strips can be fed through an adhesive application station for application of an adhesive material thereto in a desired pattern. The reinforcing strips and bags are brought into registration and are adhesively attached to form the reinforced bags.

17 Claims, 11 Drawing Sheets

Related U.S. Application Data

(60) Provisional application No. 61/796,247, filed on Nov. 5, 2012.

(51) Int. Cl.
*B31B 70/81* (2017.01)
*B65D 33/00* (2006.01)
*B31B 70/96* (2017.01)
*B31B 150/00* (2017.01)
*B31B 155/00* (2017.01)
*B31B 160/20* (2017.01)

(52) U.S. Cl.
CPC ......... *B31B 70/96* (2017.08); *B31B 2150/002* (2017.08); *B31B 2150/003* (2017.08); *B31B 2155/00* (2017.08); *B31B 2155/0012* (2017.08); *B31B 2160/20* (2017.08)

(58) Field of Classification Search
CPC .......... B31B 2150/003; B31B 2160/20; B31B 70/96; B31B 2155/0012; B65D 33/007
USPC .......................................................... 493/195
See application file for complete search history.

(56) References Cited

U.S. PATENT DOCUMENTS 2,273,470 A 2/1942 Gardner
3,142,231 A 7/1964 Christensson
3,144,129 A * 8/1964 Weisberg ............... B65D 33/02 206/45.24
3,412,925 A 11/1968 Booth
3,542,566 A * 11/1970 Donavon ............... B65D 33/02 206/216
3,554,434 A * 1/1971 Anderson ............. B65D 33/02 383/104
3,659,777 A * 5/1972 Kanada .................. B65D 75/44 383/104
3,837,972 A * 9/1974 Schuster ................. B29C 53/50 156/466
3,878,771 A * 4/1975 Malcolm .................. B65D 5/70 493/67
3,945,870 A 3/1976 Johnsen
4,170,928 A 10/1979 Beasley
4,196,035 A 4/1980 Reil
4,353,497 A * 10/1982 Bustin .................. B65D 75/008 383/104
4,785,696 A 11/1988 Martiny
4,837,849 A * 6/1989 Erickson ............. B29C 65/7437 383/104
4,913,693 A * 4/1990 Ball ..................... B65D 33/065 493/194
5,080,643 A 1/1992 Mitchell et al.
5,108,355 A 4/1992 Walsh
5,242,365 A 9/1993 Counts
5,346,311 A 9/1994 Siler et al.
5,746,871 A 5/1998 Walsh
5,845,769 A * 12/1998 Yeager ................... B65D 31/12 206/204
6,132,351 A 10/2000 Lotto et al.
6,139,662 A 10/2000 Forman
6,254,519 B1 7/2001 Toshima
6,332,488 B1 12/2001 Walsh
6,334,710 B1 * 1/2002 Kuge ..................... B65D 31/08 383/104
6,409,646 B1 * 6/2002 Focke ................ B65D 85/1045 493/7
6,425,847 B1 * 7/2002 Broenstrup ............. B31B 70/00 493/186
6,637,646 B1 10/2003 Muise et al.
6,683,289 B2 1/2004 Whitmore et al.
6,869,387 B2 3/2005 Post et al.
6,986,920 B2 1/2006 Forman et al.
7,019,271 B2 3/2006 Wnek et al.
7,510,515 B2 3/2009 Ichikawa
7,604,155 B2 10/2009 Bossel et al.
7,819,583 B2 10/2010 Walker et al.
7,837,606 B2 11/2010 Tetenborg et al.
8,013,280 B2 9/2011 Robison et al.
8,066,137 B2 11/2011 Sanfilippo et al.
8,118,199 B2 * 2/2012 Wilbur ................... A47G 19/24 206/390
8,142,077 B2 3/2012 Iannelli, II et al.
8,206,033 B2 6/2012 Sato et al.
8,251,971 B2 * 8/2012 Graf .................... A61M 1/1656 383/104
8,317,671 B1 11/2012 Zoeckler
8,403,819 B2 3/2013 Zoeckler
8,403,820 B2 3/2013 Zoeckler
8,468,782 B2 6/2013 Michalsky et al.
8,474,163 B2 7/2013 Rubin
8,500,330 B2 8/2013 Nomura et al.
8,579,780 B2 11/2013 Senb
9,050,770 B1 * 6/2015 Russell ................... B31B 70/60
9,540,145 B2 * 1/2017 Porchia ................ B65D 75/008
2003/0080120 A1 5/2003 Whitmore et al.
2003/0185948 A1 10/2003 Garwood
2006/0009339 A1 1/2006 Sleight et al.
2006/0096978 A1 * 5/2006 Lafferty ............... B65D 5/0209 219/730
2010/0046861 A1 2/2010 Wilcoxen
2010/0263332 A1 10/2010 Files et al.
2011/0052106 A1 3/2011 Holmes et al.
2013/0068653 A1 3/2013 Lipinski

FOREIGN PATENT DOCUMENTS

EP 1 424 290 A2 6/2004
EP 1 964 785 9/2008
JP S61-232175 10/1986
JP S63-502418 9/1988
JP 5-28626 4/1993
JP 2011-168330 9/2011
JP 2011-168331 9/2011
JP 2012-51579 3/2012
JP 2012-152901 8/2012
JP 2012-187899 10/2012
WO WO 87/03249 6/1987
WO WO 2008/086277 7/2008

OTHER PUBLICATIONS

International Search Report and Written Opinion for PCT/US2013/031233 dated Aug. 9, 2013.
Notification of Reasons for Refusal for JP Application No. 2015-540656 dated Apr. 8, 2016 and English translation.
Office Action for U.S. Appl. No. 13/826,130, dated Sep. 21, 2015.
Response to Election of Species for U.S. Appl. No. 13/826,130, dated Nov. 2, 2015.
Office Action for U.S. Appl. No. 13/826,130, dated Jan. 6, 2016.
Amendment A and Response to Office Action for U.S. Appl. No. 13/826,130, dated Mar. 4, 2016.
Office Action for U.S. Appl. No. 13/826,130, dated Apr. 19, 2016.
Request for Continued Examination (RCE) Transmittal for U.S. Appl. No. 13/826,130, dated Jul. 19, 2016.
Amendment B and Response to Final Office Action for U.S. Appl. No. 13/826,130, dated Jul. 19, 2016.
Office Action for U.S. Appl. No. 13/826,130, dated Jan. 31, 2017.
Amendment C and Response to Office Action for U.S. Appl. No. 13/826,130, dated Mar. 28, 2017.
Office Action for U.S. Appl. No. 13/826,130, dated May 9, 2017.
Amendment D and Response to Office Action for U.S. Appl. No. 13/826,130, dated Jun. 30, 2017.
Notice of Allowance and Fee(s) Due for U.S. Appl. No. 13/826,130, dated Aug. 23, 2017.
Amendment Under 37 C.F.R. § 1.312 for U.S. Appl. No. 13/826,130, dated Sep. 6, 2017.
Response to Rule 312 Communication for U.S. Appl. No. 13/826,130, dated Sep. 14, 2017.

(56) References Cited

OTHER PUBLICATIONS

Part B—Fee(s) Transmittal for U.S. Appl. No. 13/826,130, dated Nov. 8, 2017.

* cited by examiner

METHOD AND SYSTEM FOR MANUFACTURING BAGS

CROSS-REFERENCE TO RELATED APPLICATIONS

This application is a divisional application of U.S. patent application Ser. No. 13/826,130, filed on Mar. 14, 2013, which claims the benefit of U.S. Provisional Patent Application No. 61/796,247, filed on Nov. 5, 2012.

INCORPORATION BY REFERENCE

The disclosures of U.S. patent application Ser. No. 13/826,130, which was filed on Mar. 14, 2013, and U.S. Provisional Patent Application No. 61/796,247, which was filed on Nov. 5, 2012, are hereby incorporated by reference for all purposes as if presented herein in their entirety.

FIELD OF INVENTION

The present invention generally relates to the manufacture of packaging materials such as bags. In particular, the present invention is directed to methods and systems for manufacturing bags including a supporting or reinforcing material applied thereto for facilitating opening of the bags and supporting the bags in an open condition.

BACKGROUND OF THE INVENTION

Bags, such as paper or plastic bags, traditionally have been used for the packaging and transport of products from bulk materials such as rice or sand to larger items. Bags generally are cheap and easy to manufacture and can be formed in different configurations and sizes, and can be used for storage and transport of a wide variety of products. In particular, in the Fast Food industry, bags are frequently used for packaging of prepared food items, such as sandwiches, etc. Currently, there is a growing demand for bags or similar packages for use in packaging various products, including sandwiches and other prepared food items, that a worker can easily open, such as with one hand, and have the bag supported in an open configuration to enhance the efficiency of packaging of such products. However, it is equally important that the costs of such bags necessarily must be minimized as much as possible. While various bag designs including reinforcing or supporting materials have been developed, often, the manufacture of such specialty bags having reinforcing layers or materials supplied thereto has required multiple stages or operations, which can significantly increase the cost of manufacture of such bags.

Accordingly, it can be seen that a need exists for a system and method of manufacturing bags that can be easily opened and maintained in their open configuration, which addresses the foregoing and other related and unrelated problems in the art.

SUMMARY OF THE INVENTION

Briefly described, the present invention generally relates to a system and method for forming reinforced bags. The bags can generally be made from a paper, plastic or other stock material, with each bag further being provided with a reinforcing element or member generally applied between the opened and sealed or closed ends thereof. The reinforcing strips can be of varying widths and can extend about or over the closed ends of the bags, in some embodiments enclosing such closed ends, and will provide support for the bags upon loading with a product or article or series of articles therein. In some embodiments, the reinforcing elements can be folded with their bags into a configuration supporting the bags in a freestanding, upright and opened condition for ease of loading.

According to one example aspect or embodiment of the present invention, the bags can be fed from a strip or roll of the bag material along a path of travel, with the bag material generally folded and a longitudinal seam formed therein. The folded and longitudinally seamed web of bag material then can be passed through or between compression rollers that can be adjusted to apply varying amounts of tension or compression to the web of bag material for forming folded side edges therealong, to provide a desired gapping or "fluff" between the plies of the bags to facilitate opening of the bags. Thereafter, the bags can be fed toward a registration position for attachment to the reinforcing elements.

The reinforcing elements generally will be fed along a corresponding path of travel toward registration and attachment to the respective bags. The reinforcing material can be fed from a stacked supply or from a roll and typically will be cut into individual strips or lengths. These reinforcing strips further can be creased, scored or subjected to other, similar operations so as to form fold lines at spaced locations along the length thereof. As the reinforcing strips are fed along their path of travel toward registration with the bags, the reinforcing strips can be passed through a first or upstream adhesive application station wherein an adhesive material can be applied in a first desired pattern to each of the reinforcing strips. Such an adhesive pattern can be varied and applied in a controlled manner, such as by the use of an adhesive printing system, by spray applicators, or other applicators. The pattern of the adhesive applied to the reinforcing strips generally will be controlled so as to facilitate the folding of the reinforcing strips and bags attached thereto into a desired configuration, whether it be in a freestanding configuration, with the bags being supported by their reinforcing strips, or simply in a supported, opened condition or configuration for ease of loading.

The reinforcing strips will be brought into registration with their associated bags and generally will be urged into tight adhesive contact therewith. Thereafter, the bags with the reinforcing strips attached thereto can be passed through a second or downstream adhesive application station wherein an additional adhesive material can be applied to either the bag or peripheral side portions of the reinforcing strips. The peripheral side portions of the reinforcing strips then can be folded and placed into adhesive contact with the bags to complete the formation of the reinforced bags, which then will be collected for storage and/or transport.

According to another alternative aspect of the present invention, the system and method for forming reinforced bags can be adapted to formation of multiple lines or series of reinforced bags. In such an embodiment, an elongated web of bag material can be fed along a path of travel to or through a first cutting station for separating the web of bag material into multiple lanes or lines of bag materials. After folding and longitudinally seaming the multiple lines of bag materials, the bag materials can be collected on a storage roll or drum, or alternatively, can be fed directly to a station for application of corresponding reinforcing elements or members thereto. In similar fashion, the reinforcing elements can be fed from a roll of reinforcing material into and through a cutting station where the reinforcing elements are separated into individual reinforcing strips, or alternatively, can be fed from pre-cut stacks or supplies of such reinforcing strips, along a corresponding path of travel toward registration with their respective bags.

The reinforcing strips generally will be passed through a first or upstream adhesive application station for application of adhesive in a desired pattern thereto, after which the reinforcing strips can be brought into tight adhesive or bonded contact with the bags. The bags, with the reinforcing strips thus initially adhesively attached thereto, and with portions of the reinforcing strips generally overlapping the sides of the bags, then can be collected, or fed through an additional or downstream adhesive application station, wherein a further or second adhesive material application will be made to the bag or to the overlapping portions of the reinforcing strips. The reinforcing strips then can be fed through a folding station for folding the peripheral side portions of the reinforcing strips into adhesive contact with the bags. If necessary, an end of the bags thereafter can be sealed such as by a heat sealing or other seaming apparatus. The bags then can be collected for storage and transport.

Various features, advantages and aspects of the present invention may be set forth or apparent from consideration of the following description of the invention, taken in conjunction with the accompanying drawings. Moreover, it will be understood that the accompanying drawings, which are included to provide a further understanding of the present disclosure, are incorporated in and constitute a part of this specification, illustrate various aspects, advantages and benefits of the present disclosure, and, together with the following description, serve to explain the principles of the present invention and disclosure. In addition, those skilled in the art will understand that, according to common practice, various features of the drawings discussed below are not necessarily drawn to scale, and that dimensions of various features and elements of the drawings may be expanded or reduced to more clearly illustrate the embodiments of the present disclosure.

DESCRIPTION OF THE INVENTION

Figure 1A:
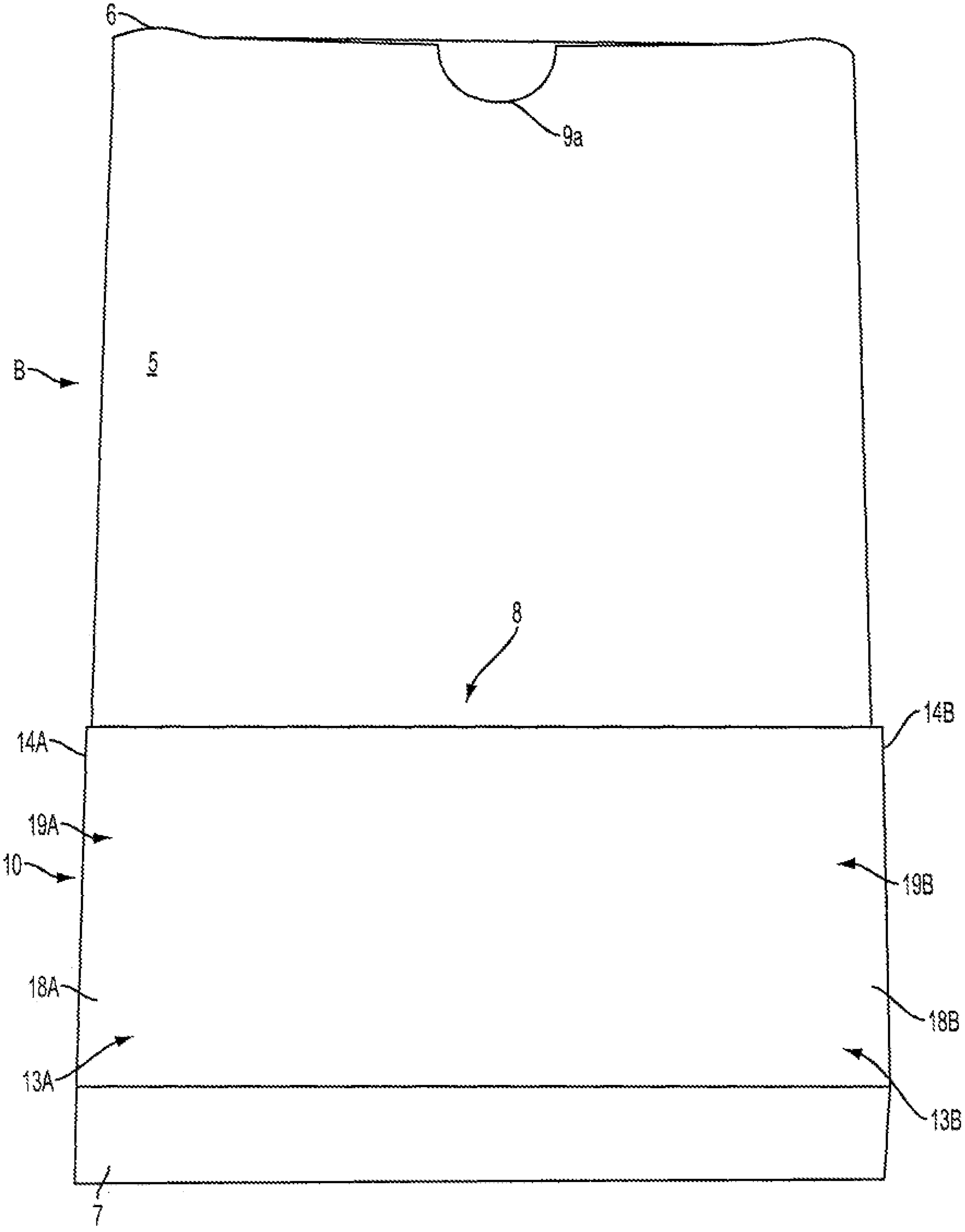
FIG. 1A is a front view of one embodiment of reinforced bag formed according to the system and method of forming bags according to the principles of the present invention.

The present invention generally is directed to a system and method for the formation of bags, and in particular to the formation of bags having a reinforcing material integrated with or applied thereto so as to facilitate the opening of the bags, and once open, for maintaining the bags in such an opened configuration or condition for ease of loading and packaging products within such bags. For example, FIGS. 1A-1C, 1D-1E and 1G show examples of reinforced Bags B formed according to the system and method of the present invention. As illustrated in FIG. 1A, the Bags B typically can be formed from a paper stock material, although various plastic or other bag materials also can be used, and can be lined or coated with a desired material. The Bags B also generally will include a tubular body 5 typically having an open upper end 6 and a closed and/or sealed lower end 7. As discussed with respect to FIGS. 2-4 below, the body of each Bag B can be formed by the folding of the bag material, with the edges of the bag material generally overlapping and being adhered, sealed or otherwise affixed together along a longitudinally extending seam 8 and by the sealed lower end 7 of the body 5. Additional opening features, such as cut-outs 9*a* to facilitate gripping, or gussets 9*b* (FIGS. 1D-1E) to facilitate opening and maintaining the bag in an open condition also can be provided.

Figure 1B:
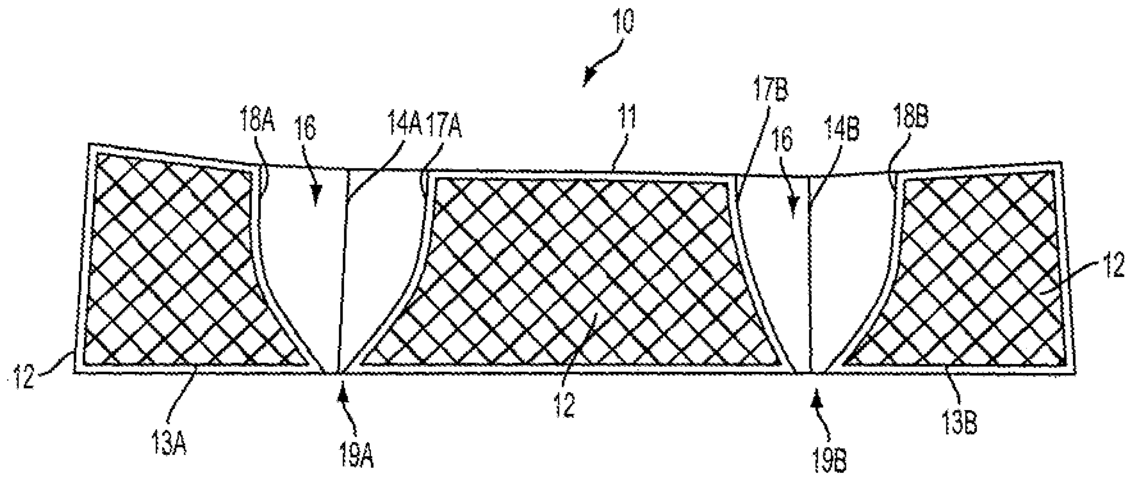
FIG. 1B is a plan view of a reinforcing strip that can be applied to the bag of FIG. 1A, with an example of one application of adhesive as schematically illustrated thereon.
Figure 1C:
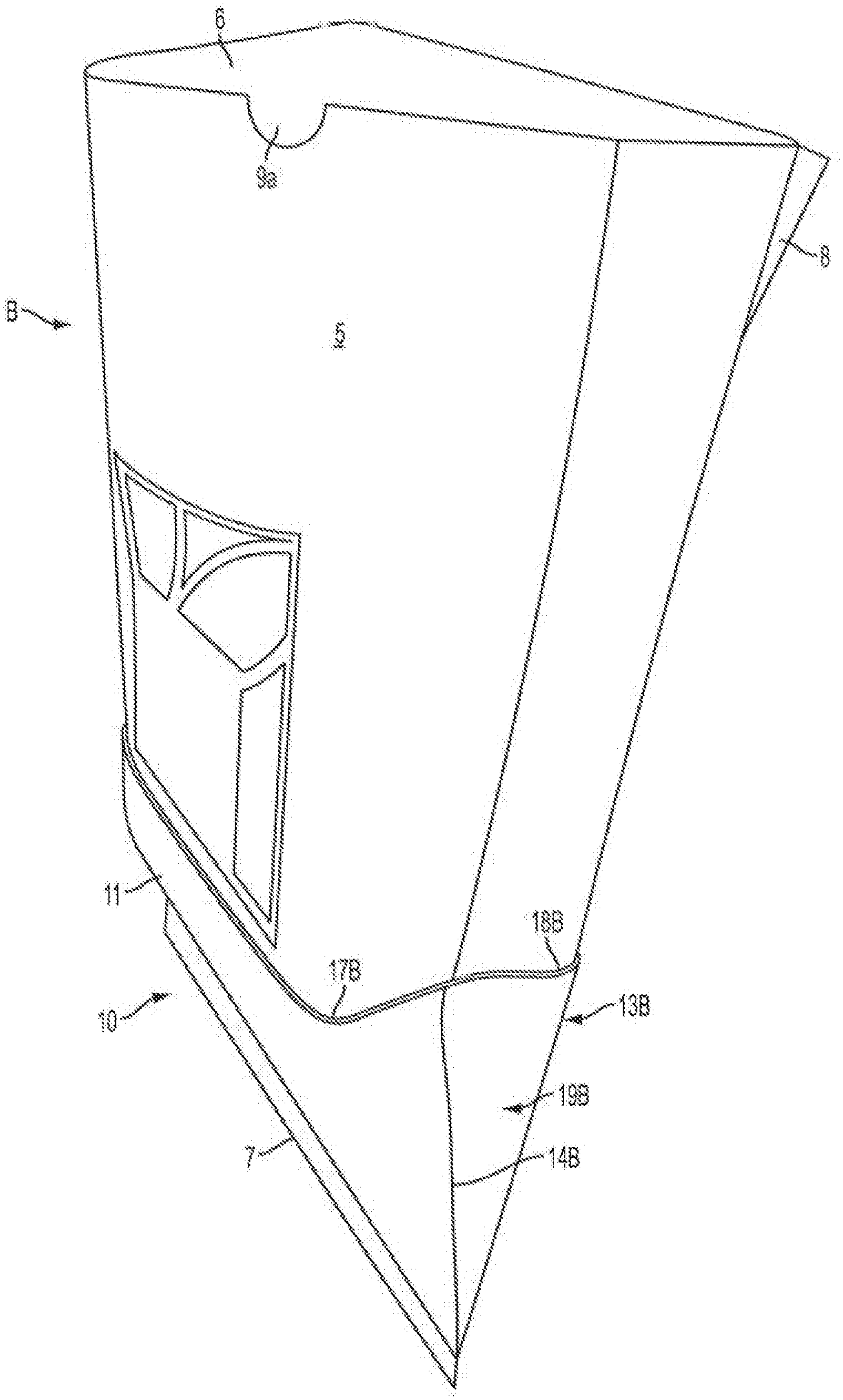
FIG. 1C is a perspective view of the reinforced bag of FIG. 1 shown in an opened configuration.
Figure 1D:
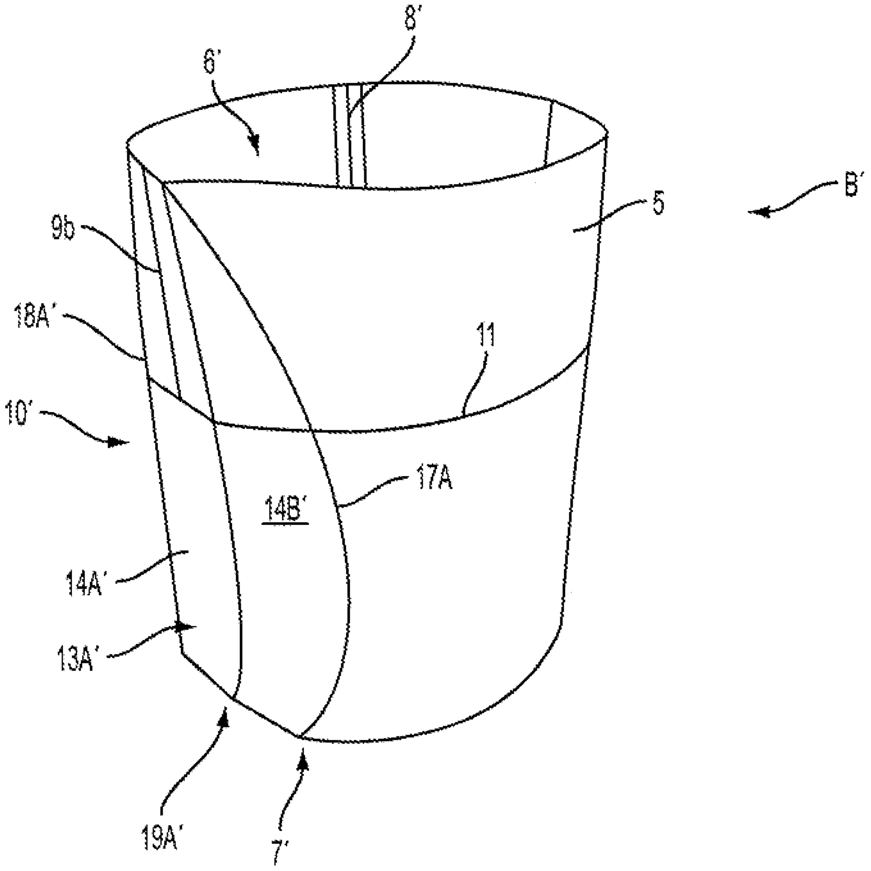
FIG. 1D is yet another perspective view of an alternative configuration of a reinforced bag formed according to the principles of the present invention.
Figure 1E:
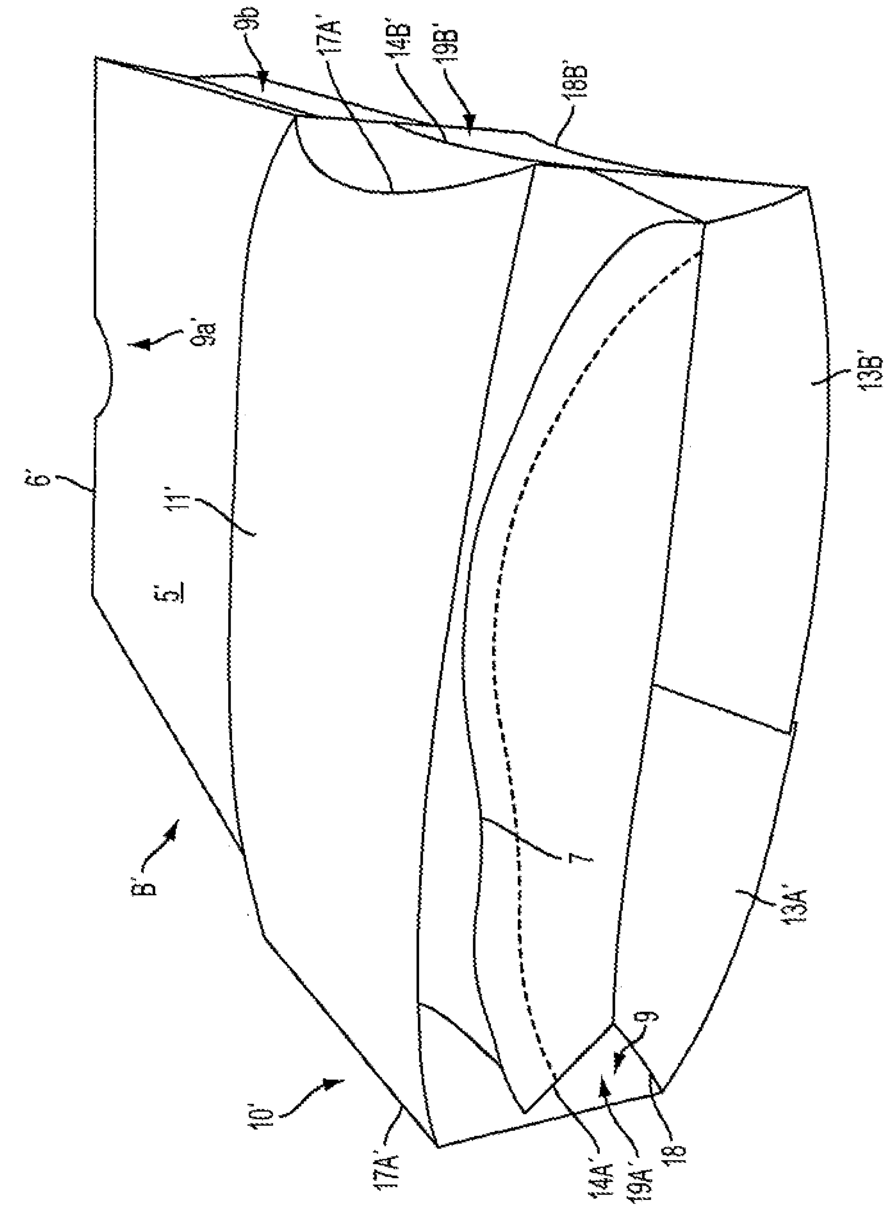
FIG. 1E is a bottom end view of the reinforced bag of FIG. 1D.
Figure 1F:
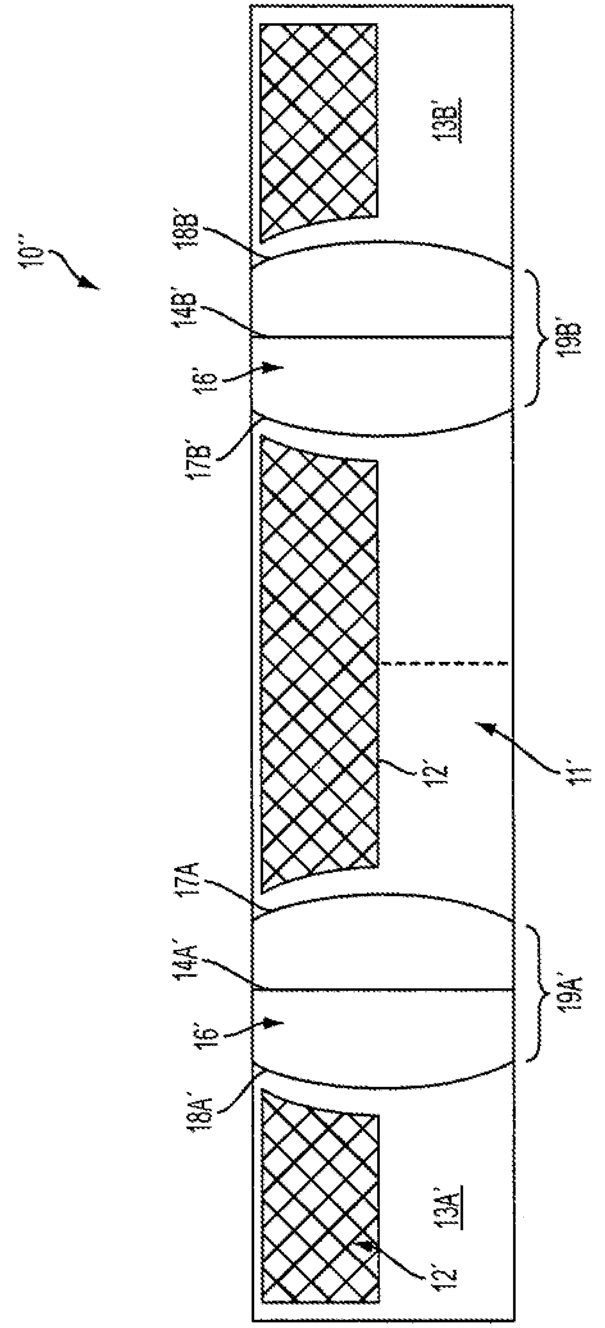
FIG. 1F is a plan view of a reinforcing strip that can be applied to the bag as shown in FIGS. 1F-1G with another example application of adhesive illustrated thereon.
Figure 1G:
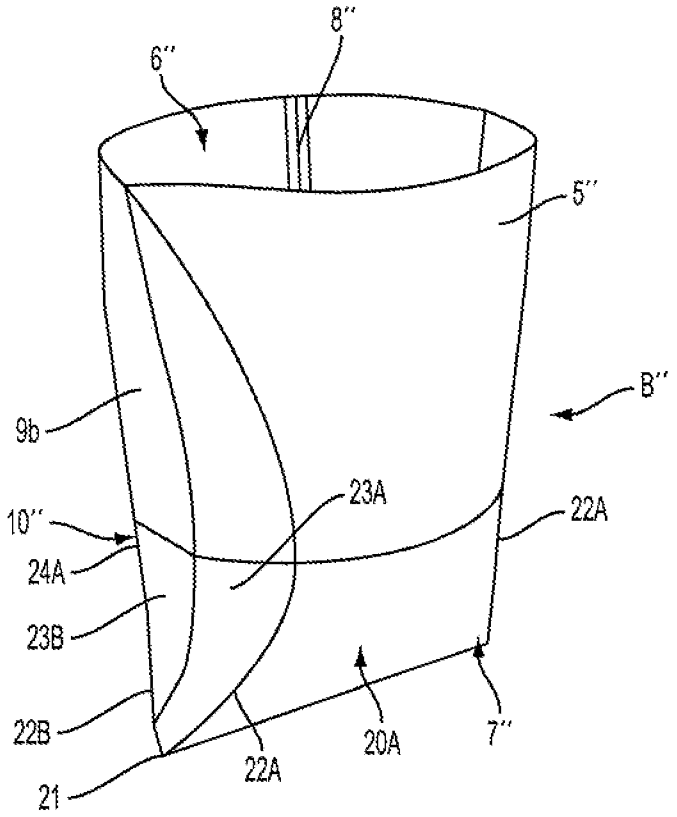
FIG. 1G is a perspective view of an alternative configuration of a reinforced bag formed according to the principles of the present invention.

A reinforcing element or member 10, shown in FIGS. 1A-1C as a strip of material that is typically made from a more rigid material such as a clay-coated natural kraft ("CCNK"), can be applied to the body 5 of the Bag (FIGS. 1A and 1C), and can be located or applied adjacent the lower or second end 7 of the body 5. Other materials such various card-stocks, paper, plastic or other synthetic or natural materials also can be used to form the reinforcing strip. The reinforcing strip 10 typically can be applied as a band or strip of a desired width, as illustrated in FIGS. 1B-1E. The reinforcing element 10 further generally will include a main or central body section 11 that can be of different heights or widths including extending partially along the Bag B as shown in FIGS. 1C, 1D and 1G. In addition, reinforcing elements that are substantially equal in width or height to the width of the body of the Bag also can be used, such as to form stand-alone bags (FIG. 1D) and/or bags with gusseted folds or other easy-opening and/or support features.

The reinforcing element 10 (FIG. 1B) further generally will be adhered to a front surface of the body of the Bag B by an adhesive material, indicated by numeral 12 in FIG. 1B. Folding peripheral side portions 13A and 13B generally will be attached to the edges of the main body section 11 of the reinforcing strip 10 alongside fold lines 14A/14B (broadly: a "fifth fold line" and a "sixth fold line," respectively). Each of the side portions 13A/13B also generally can be of a length sufficient to overlap one another when in a folded configuration about the body of the Bag as illustrated in FIG. 1A. Additional adhesive material indicated by numeral 12, in FIG. 1B, further generally can be applied to each of the peripheral side portions 13A/13B in a desired pattern for adhering the side portions to the body 5 of the Bag B, as well as to each other when the side portions are in their folded or engaging positions wrapped about the body of the Bag as indicated in FIG. 1A.

As additionally illustrated in FIG. 1B, the adhesive materials 12 applied to the reinforcing strip generally can be applied in desired patterns, with open areas or gaps, indicated by 16, created or left in the pattern(s) of the adhesive material applied to the reinforcing strip 10. Thus, for example, the pattern of the adhesive materials, which can be varied as needed or desired, generally will extend along or adjacent additional fold lines 17A/B (broadly: a "first fold line" and a "third fold line," respectively) and 18A/B (broadly: a "second fold line" and a "fourth fold line," respectively) formed in the body and in the side portions of the reinforcing strip on opposite sides of the side fold lines 14A/14B. The formation of fold lines 17A/B and 18A/B and the open areas 16 or gaps in the adhesive formed or applied between the fold lines 17A/17B and 18A/18B define fold and lock zones 19A/19B (FIG. 1C) for the Bag B.

The selective application of the adhesive outside of these fold and lock zones further assists in the opening of the bags without interference by the adhesive. As shown in FIGS. 1C-1E and 1G, when the Bag B is in its opened configuration, such fold and lock zones 19A/19B are expanded, and will help maintain the Bag in its open configuration. As shown in FIGS. 1D-1E, these fold and lock zones also can be designed to provide additional stability or support for maintaining the Bags in an upright configuration or free-standing condition for further ease of loading.

FIGS. 1D-1E further illustrate yet another embodiment of a reinforced Bag B' formed according to the principles of the present invention. In this embodiment, the Bag B' is adapted to be a standing, vertically supported Bag, as shown in FIG. 1D, wherein the Bag can be maintained in an upright, upstanding orientation with its upper end 6' being in a substantially opened configuration for ease of loading. In this embodiment, the reinforcing element 10' generally can be configured in similar fashion to the reinforcing element 10 of FIG. 1B, with an elongated body having a main/center body (FIG. 1F) 11' having fold lines 14A' and 14B' separating a main or center body section 11' of the reinforcing element 10' from peripheral side portions 13A' and 13B'. Additional gusset fold lines 17A'/B' and 18A'/B' also can be formed on opposite sides of the fold lines 14A' and 14B', with the gusset fold lines 17A'/B' and 18A'/B' generally being shown as having a substantially arcuate or curved/semicircular configuration (although other configurations also can be used) so as to define gusseted areas or fold and lock zones 19A'/19B'. In addition, the reinforcing element 10' shown in FIG. 1F illustrates yet another potential adhesive pattern 12' being applied to the main body 11' and peripheral side portions 13A'/13B' of the reinforcing strip, with open areas 16' defined therebetween. As illustrated in FIG. 1F, the adhesive material can be applied only to limited portions or sections of the reinforcing strip, as opposed to being applied substantially across the width thereof in a desired pattern as illustrated in FIG. 1B. As a result, as indicated in FIG. 1F, the body 5' of the Bag B' can be sufficiently adhered to its reinforcing element 10', with the lower or bottom end 7 of the Bag body 5' remaining substantially free from attachment thereto as needed or desired.

Figure 1H:
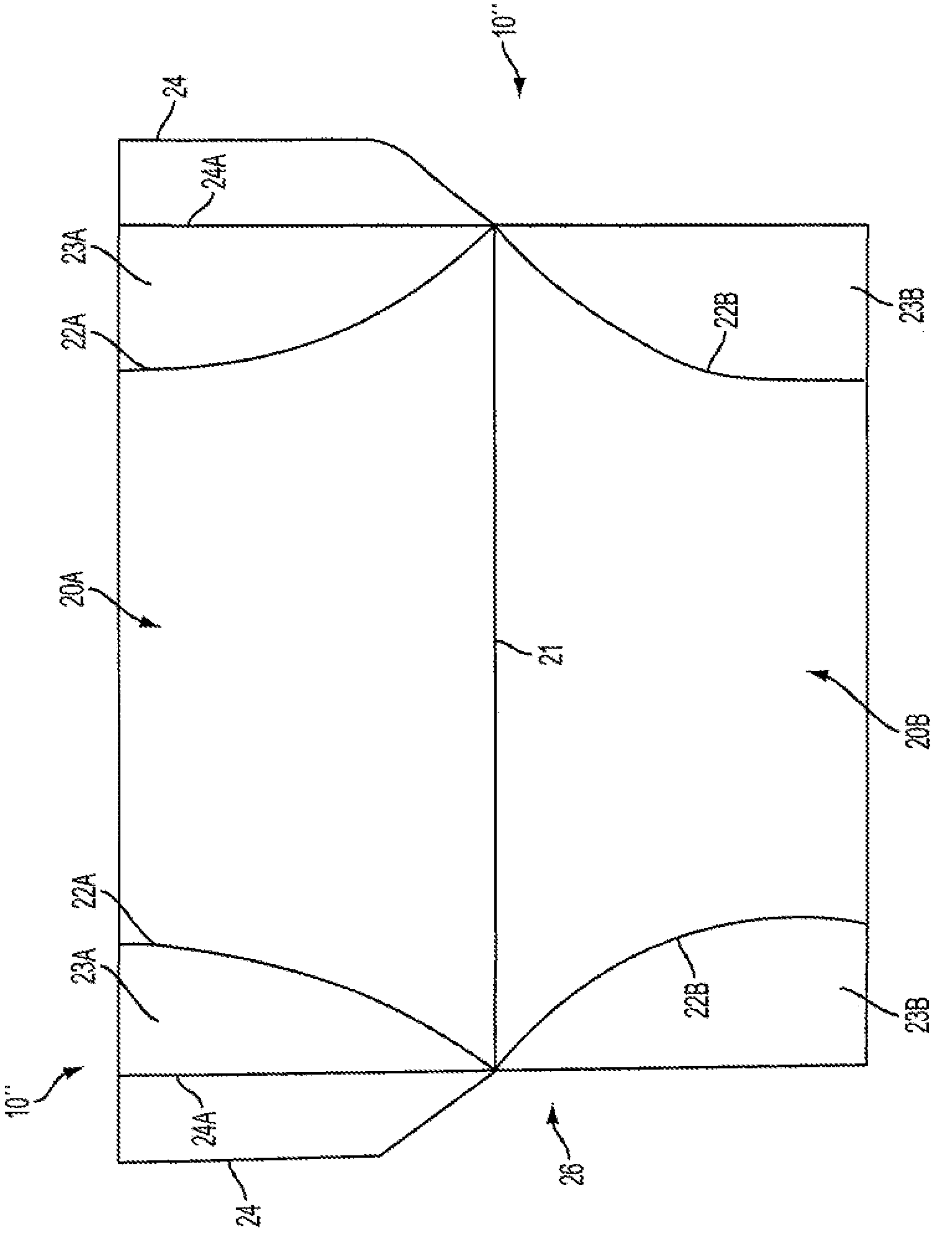
FIG. 1H is a plan view of a reinforcing strip for use with the reinforced bag of FIG. 1G with another example application of adhesive illustrated thereon.

FIG. 1G illustrates another embodiment of a reinforced Bag B" wherein the reinforcing element 10' is extended about and substantially encapsulates the bottom or lower end 7 of the Bag body 5. In such an embodiment, the reinforcing element thus can substantially seal and enclose the bottom or lower end of the Bag without the Bag necessarily having to be separately sealed. As shown in FIG. 1H, in this embodiment, the reinforcing element 10" generally can include a body 20 including first and second body sections 20A and 20B formed on opposite sides of a fold line 21. Additional arcuate or curved fold lines 22A/22B define gusseted or lock and fold areas 23A and 23B for supporting the Bag in a substantially opened configuration, such as shown in FIG. 1D. Glue flaps 24 can be formed along side edges of at least one of the body sections 20A or 20B, attached along fold lines 24A, as shown in FIG. 1H, and with the gusset or lock and fold zones 23A being defined or formed in the areas bordered by fold lines 22A and 22B in similar fashion to lock and fold zones 19A/19B of the reinforcing strip 10 shown in FIG. 1B.

Figure 2:
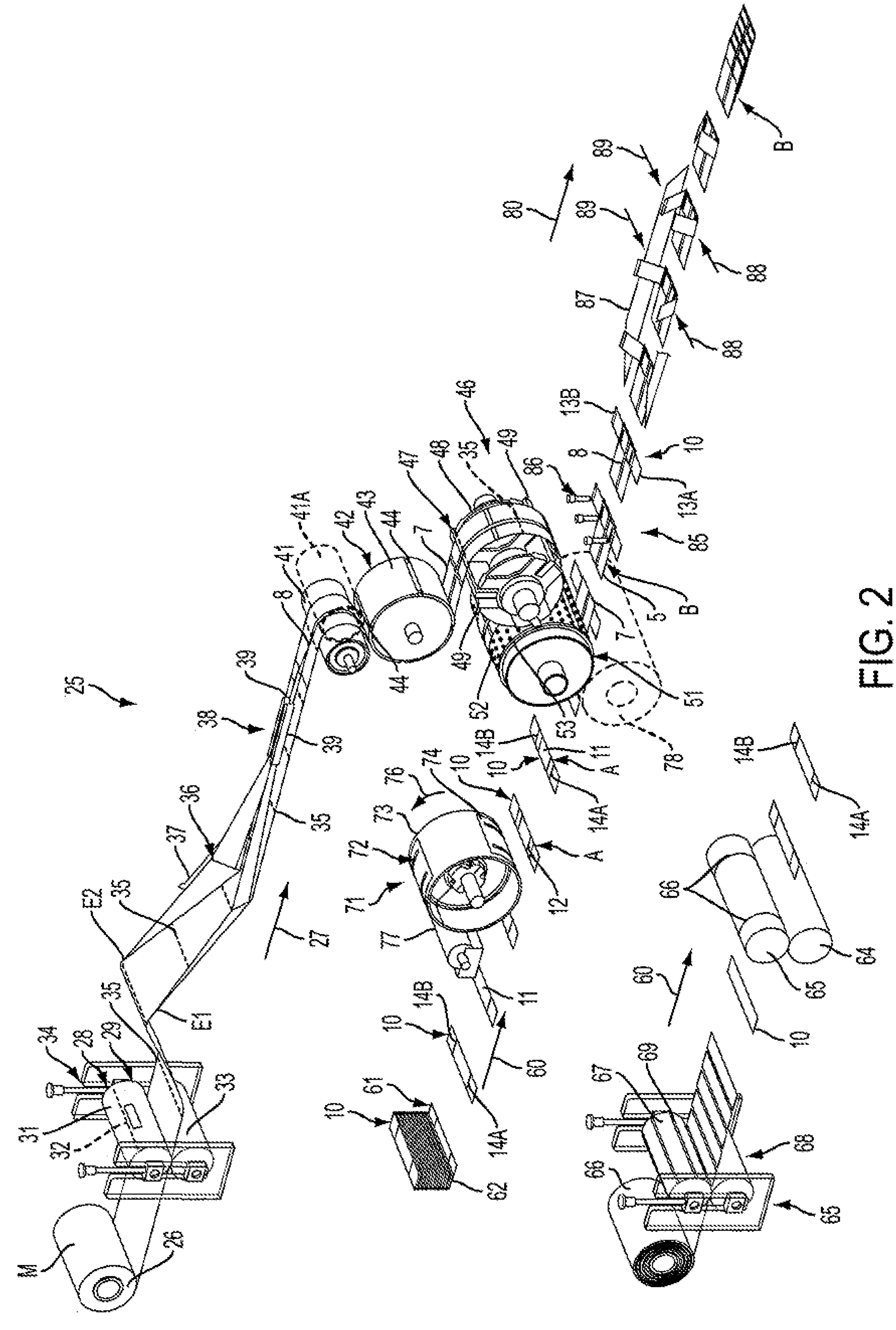
FIG. 2 is a schematic illustration of a first embodiment of a system and method for forming reinforced bags according to the principles of the present invention.
Figure 3:
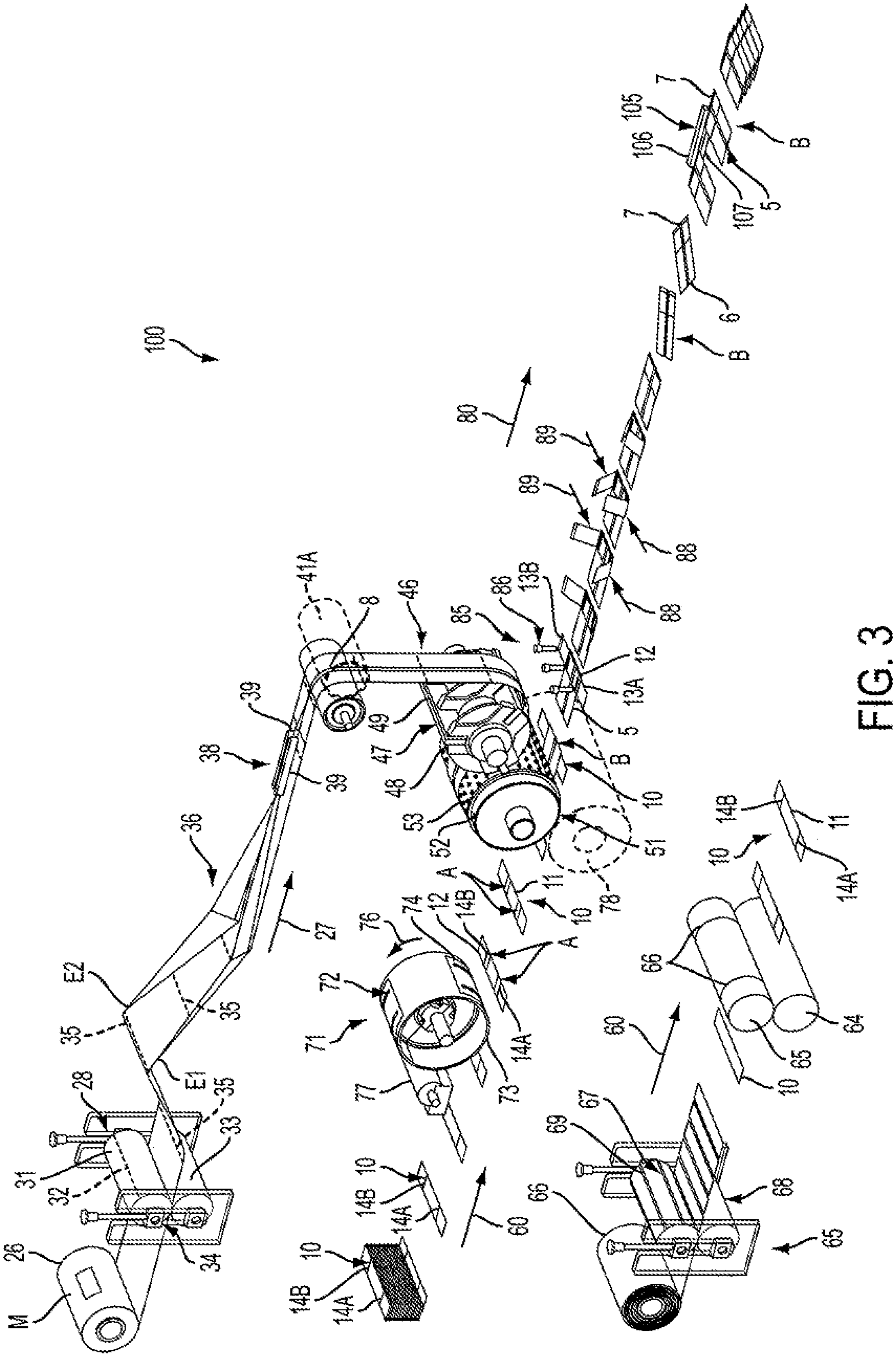
FIG. 3 is a schematic illustration of an additional embodiment of a system and method for forming reinforced bags according to the principles of the present invention.
Figure 4:
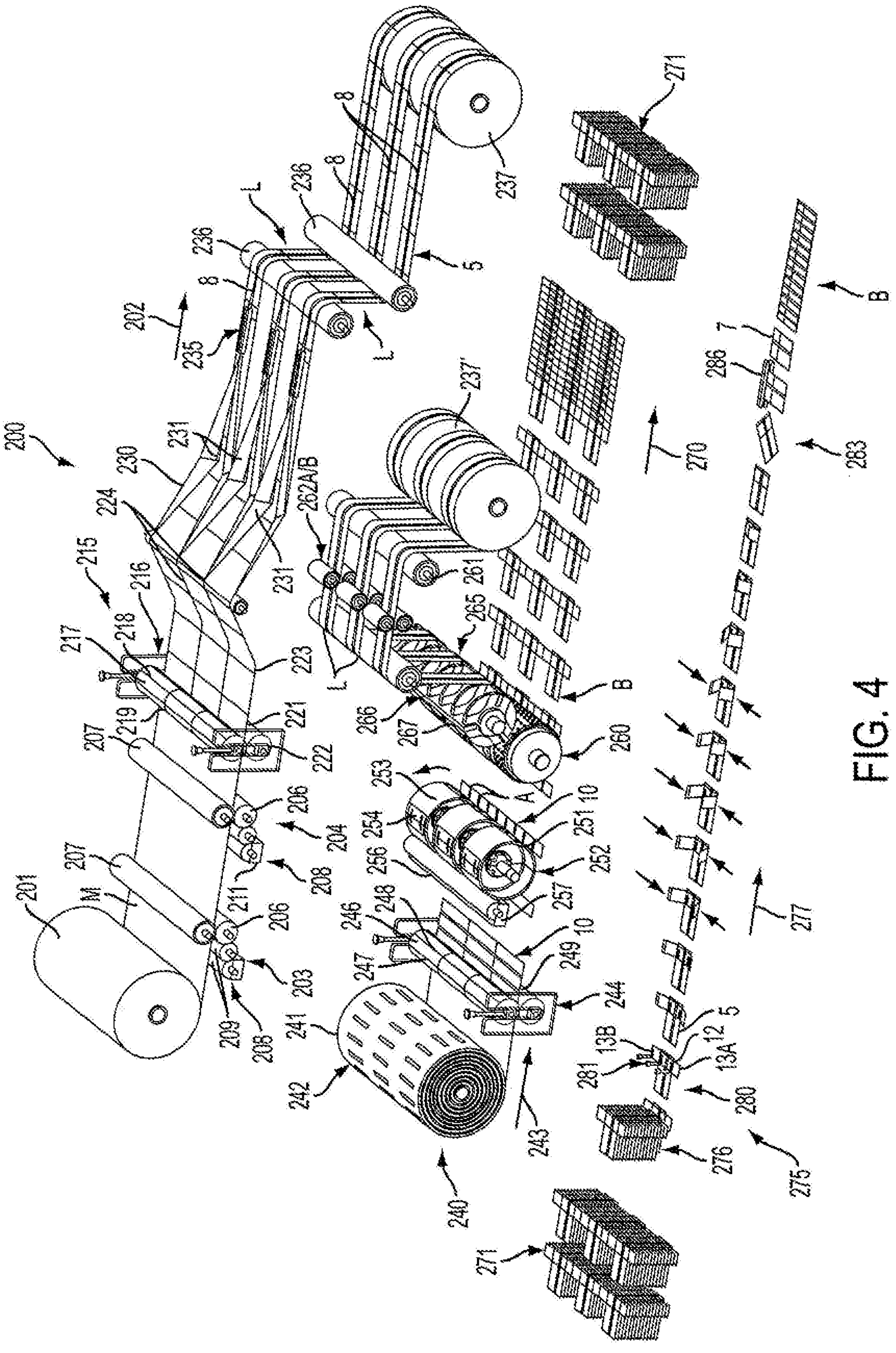
FIG. 4 is a schematic illustration of still a further embodiment of a system and method for forming reinforced bags in multiple lanes, in accordance with the principles of the present invention.

FIGS. 2-4 generally illustrate various example embodiments of systems and methods 25, 100 and 200 for forming the reinforced Bags B in accordance with the principles of present invention.

As illustrated in FIG. 2, in a first embodiment 25 of the system and method for manufacturing reinforced Bags, a bag material M, which can include a preprinted paper or other material, is fed from a roll or supply 26 along an initial path of travel, as indicated by arrow 27. The bag material can be pre-printed both with various designs, lettering, labels or other graphics. The web of bag material can be fed through an initial die cutting station 28, shown in FIG. 2 as including a rotary die cutter 29, having a first or upper, cutting roller 31 to which one or more cutting edges or blades 32 can be mounted. The cutting edges 32 of the cutting roller 31 are rotated into engagement with the bag material, with the paper material being engaged between the cutting roller 31 and a lower, second roller or anvil 33. The spacing of the rollers further can be adjusted by adjusting the framework 34 thereof.

As the bag material is fed between the upper and lower rollers of the die cutting station, a series of perforations, score lines, cuts or other lines of separation 35 can be formed at spaced intervals along the length of the web bag material as indicated in FIG. 2. These perforations can provide lines of separation for detaching or separating the Bags from the web of bag material. Additionally, the perforations can be formed by the rotary die cutter in a variety of areas/locations of the web and/or in a variety of configurations for defining further opening features of the Bags, e.g., for splitting or separating the Bags longitudinally or for facilitating opening of the Bags for product loading therein, such as forming/defining thumb slots or other features for assisting in separating the unsealed edges of the Bag. It further will be understood by those skilled in the art that other types of cutting stations or cutting mechanisms also can be used, and that such perforations may not be used/necessary depending on the bags being formed.

As the now perforated bag material web is fed further along its initial path of travel 27, it will be passed through a folding or tube forming station 36. The tube forming station 36 generally can include one or more folding plates, such as indicated at 37 (only one of which is shown). The folding plates guide the peripheral side edges E1/E2 of the web of bag material M inwardly and about a mandrel or similar folding mechanism in order to form a tube or sleeve as shown in FIG. 2. Thereafter, the folded web of bag material can be passed through a seaming station 38, which can include a series of heat seal bars 39 that engage and form the longitudinal seals 8 for the Bags. As further will be understood by those skilled in the art, additional seaming systems or apparatus also can be used, for example, such seams can be formed by adhesive applicators or other seaming mechanisms.

In the embodiment of FIG. 2, the folded and seamed web of bag material M thereafter is fed about a first guide roll 41 and into engagement with a bottom seaming mechanism 42. As the web of bag material passes about roller 41, the side edges/fold lines of the Bags generally will be formed. The formation of such fold lines/side edges, and thus the tightness of such folds, can be controlled by controlling the compression and/or tension of the web of bag material passing about the roller 41, to enable a "fluff" or gapping between the plies of the Bags, for ease of opening of the Bags. A compression roller or nip roller (shown by dashed lines 41A in FIG. 2) also can be positioned adjacent the roller 41 such that the web of bag material is compressed or flattened therebetween, with the nip or compression applied to the web of bag material passing between the rollers being controlled to control the extent of the folding of the side edges as needed or desired to provide the desired gapping for opening of the Bags.

The bottom seaming mechanism 42 receives the web of bag material from the roller 41, and is shown in FIG. 2 as including a rotary heat seal roller having a body 43 including a series of heating or sealing elements 44 arranged at spaced locations about the circumference of the roll 43. As the web of bag material passes thereover, the heating or sealing elements 44 of the rotary heat seal mechanism can form the bottom seal/end 7 for each of the Bags at spaced intervals along the web of bag material adjacent the perforations 35 formed therein. A nip roller or other bearing surface (not shown) further can be provided adjacent the heat seal roller 43 for providing a contact surface against which the sealing elements 44 can engage the web of bag material to form the sealed ends of the Bags.

The web of bag material, with the longitudinal seam 8 and bottom sealed portions 7 for the Bags formed therein, thereafter generally will be fed into an inline cutting station 46 for separation of the individual Bags from the web of bag material as illustrated in FIG. 2. The cutting station 46, in one example embodiment, can include a rotary cutoff knife or cutter 47, having a rotating drum 48 with a series of spaced cutting blades 49 mounted thereabout. The cutting blades can be aligned with certain ones of the perforations 35 formed in the web of bag material, or other locations between these perforations as needed for forming various features in the Bags and/or for separating the Bags if needed, and will engage the web of bag material against a vacuum drum 51. The vacuum drum 51 will apply a suction or vacuum against the web of bag material so as to hold the web of bag material against the surface 52 of the vacuum drum as the cutting blades 49 of the rotary cutoff knife 47 engage and separate the Bags from the web of bag material. A series of ports or openings 53 further generally can be formed in the outer surface 52 of the vacuum drum 51 for applying a vacuum or suction to the web of bag material to hold the cut Bags thereagainst as the Bags B are moved toward registration with their reinforcing strips 10 as shown in FIG. 2.

At substantially the same time that the Bags B are being cut from the web of bag material M, a series of reinforcing strips 10 will be fed along a coincident path of travel 60 for engagement and application to the Bags B. The reinforcing strips 10 can be fed from a blank feeder, generally indicated at 61 in FIG. 2, in which a series of reinforcing strip blanks can be fed from a magazine or stack 62 individually along their path of travel 60. Alternatively, as also indicated in FIG. 2, the reinforcing strips 10 can be fed directly from a cutting station 65 wherein a roll 66 of a reinforcing material, such as a pre-printed CCNK material, paper material, plastic, or other, similar reinforcing material, can be fed between a pair of upper and lower cutting rollers 67 and 68 of the cutting station 65. At least one of the rollers (e.g., the upper roller 67) can have a series of cutting blades or cutting edges 69 formed at spaced locations thereabout, such that as the web of reinforcing strip material is fed through the cutting station, a series of individual reinforcing strip blanks are cut or separated therefrom. The reinforcing strips then can be fed along their path of travel 60 toward engagement and application to the Bags B. As also indicated in FIG. 2, the reinforcing strips 10 can be scored, creased or otherwise engaged to form fold lines 14A/14B. For example, the reinforcing strips, after being cut from the roll 66, can be passed between compression rolls 64/65, one of which can have a blade or similar scoring or creasing element 66, to form fold lines therein.

As the reinforcing strips 10 are fed toward registration and engagement with the Bags B, each of the reinforcing strips generally will pass through a first adhesive application station 71 wherein an adhesive material can be applied in a desired pattern to each of the reinforcing strips. In one embodiment, as illustrated in FIG. 2, this first adhesive application station 71 can include a cold adhesive printer 72, which includes a rotating drum 73 with a series of printing areas or heads 74 formed or provided at spaced locations about the periphery of the drum 73. As the drum is rotated in the direction of arrow 76, it can pass over an adhesive roller or applicator, shown at 77, wherein a cold adhesive material can be picked up/applied along the adhesive printing areas 74. Alternatively, a series of spray nozzles could be provided for supplying the adhesive material to the adhesive printer 72, either positioned internally or externally.

As the reinforcing strips pass in engagement with the printing areas 74 of the printer 72, the adhesive material will be printed/applied to the reinforcing strips in a desired pattern. For example, in FIG. 2, a pair of spaced lines or areas of adhesive material 12 are shown applied to the reinforcing strips at "A" adjacent the fold lines 14A/14B thereof. However, as illustrated in FIGS. 1B and 1F above, various patterns of adhesive material 12/12' can be applied to the reinforcing strips to apply and hold the Bags to their reinforcing strips as needed, depending upon the application and/or configuration of the Bags and reinforcing strips, and it will be understood that the spaced lines of adhesive A shown in FIG. 2 are simply shown for purposes of illustration and not limitation.

As further illustrated in FIG. 2, the reinforcing strips are generally brought into registration with the Bags at the vacuum drum 51 after the Bags have been cut or separated from the web of bag material. A nip or compression roller (shown by dashed lines 78) further can be provided beneath the vacuum drum 51, with the reinforcing strips and Bags being passed between the vacuum drum and compression or nip roller so as to urge the reinforcing strips into tight, adhesively bonded contact with the Bags. The now combined Bags and reinforcing strips thereafter are fed along a downstream or secondary path of travel, indicated by arrow 80. As also indicated in FIG. 2, the Bags are generally fed with side or end portions 13A and 13B of their attached reinforcing strips overlapping the peripheral side edges of the Bags and with the Bags generally being in a face down or inverted condition with their longitudinal seams 8 facing upwardly.

The Bags B with their reinforcing strips applied thereto thereafter can be fed through a secondary adhesive applicator 85, which in this embodiment is shown as including a series of cold adhesive applicator nozzles 86, for application of additional adhesive material 12 in a desired pattern along the side portions of the reinforcing strips, such as illustrated at 14A/14B in FIG. 1C. Alternatively, the downstream or secondary adhesive applicator 85 could be eliminated, and the adhesive material applied to the side portions of the reinforcing strips could be printed or otherwise applied in the first or upstream adhesive application station 71, in conjunction with the application of the adhesive material 12 (FIG. 1B) to the main body portion 11 of the reinforcing strips, with open areas or controlled gaps 16 in the adhesive pattern applied to facilitate movement and/or folding of the lock and fold zones or gusseted areas of the Bags to a generally inwardly collapsed or folded configuration so as to enable easy opening and maintaining of the Bags in an opened condition as needed.

As the Bags are fed further along their secondary path of travel 80, the side portions 13A/13B of the reinforcing strips are engaged by folders, which can include folding plates or other folding mechanisms, such as folding plates or guides 87, or other folding mechanisms which engage and urge the side portions upwardly and over the body of the Bags, as indicated by arrows 88 and 89. As a result, the side portions of the reinforcing strips are progressively fed over and into engagement or adhesively engaged contact with the Bags and are sealed thereagainst. The resultant reinforced Bags B then can be collected in stacks and removed for cartoning and transport and/or storage.

FIG. 3 generally illustrates an alternative embodiment 100 of the system and method for forming Bags B according to the principles of the present invention. In this embodiment, the web of bag material M is fed from its upstream feed roll 26 through cutting station 28 for perforating or otherwise scoring or forming lines of separation therein, and into the tube forming station 36, as generally discussed above with respect to the embodiment shown in FIG. 2. However, in the embodiment of FIG. 3, after the longitudinal seam 8 has been formed by the heat seal bars 39 of the tube seaming station 38, the web of bag material M will be fed about guide roller 41 and directly into the cutting station 46 for engagement and cutting of the Bags therefrom by the cutting blades 49 of the rotary cutoff knife 47 of the cutting station without the end seams 7 of the Bags being formed. After the Bags B are cut from the web of bag material, they generally are engaged on the upper surface 52 of the vacuum drum 51 and are carried into adhesive engagement with the reinforcing strips 10 as indicated in FIGS. 2 and 3. Thereafter, the Bags B with their reinforcing strips 10 applied thereto, can be passed through the downstream adhesive station 85 where the adhesive material 12 is applied to the side portions 13A and 13B of the reinforcing strips 10, such as by spray nozzles or other applicators 86. The reinforcing strips then will pass through and be engaged by folding mechanisms which progressively fold the side portions of the reinforcing strips over and against the body of the Bags as shown by arrows 88/89 in FIG. 3.

Once the peripheral/side portions of the reinforcing strips have been adhered together and sealed against the body of the Bag 5 to which they are applied, the Bags then can be rotated, for example, by approximately 90° in order to reorient the Bags as shown in FIG. 3. Once the Bags are reoriented, the lower or bottom ends of the Bags are presented to and are passed through a bottom seaming station 105, here shown as including upper and lower heat seal bars 106 and 107, although other edge sealing systems or stations also can be used. As the bottom edges of the Bags are passed between the heat seal bars 106 and 107, the bottom edges 7 of each of the Bags are sealed or otherwise closed to form the completed Bags. The completed Bags then can be stacked for cartoning and transport.

Still a further embodiment 200 of the system and method of forming Bags according to the principles of the present invention is illustrated in FIG. 4. In this embodiment, the system can be designed for the formation of Bags in a multi-lane format to enable formation of multiple lines or groups of Bags substantially simultaneously. Shown in FIG. 4, an enlarged or expanded web of bag material M' is provided, here shown as being sufficient to form at least three lines L of Bags, although more or fewer lines of Bags also can be formed depending upon the size and configuration of the resultant Bags.

The expanded web of bag material M' generally will be fed from a supply roll 201 along its initial path of travel 202 along a tube/bag forming line or portion 203 of the system 200. As discussed above with respect to the embodiments of FIGS. 2 and 3, the web of bag material can be pre-printed, or, alternatively, as shown in the embodiment of FIG. 4, the web of bag material M' can be passed through a series of one or more printing stations 204A/B. Each of the printing stations can include a series of print rollers 206, compression or bearing rollers 207 and a paint or ink supply 208, here shown as including a series of applicator rolls 209 as applying ink or paint from a trough or similar supply 211. While two printing stations 204A/B generally are shown in FIG. 4, such as for printing two colors, it will further be understood by those skilled in the art that additional or fewer printing stations also can be used.

After passing through the print stations 204A/B, the web of bag material then can be fed through a cutting station 215 for cutting and/or separating the web of bag material into a series of separate lanes or strips for forming the Bags. The cutting station 215 can include various types of cutting systems, and are here shown in one embodiment as including a rotary die cutter 216 having a cutting roller 217 with longitudinal cutting edges or blades 218 as well as vertical cutting edges or blades 219 spaced therealong. A compression or bearing roller 221 further generally can be mounted below the cutting roller 217, with both rollers being adjustably mounted on a frame 222. As the web of bag material is passed between the cutting roller and bearing roller, a series of longitudinal perforations, score lines, cuts or lines of separation 223 can be formed across the width of the web of bag material, such as discussed above with respect to FIG. 2, while at the same time additional perforations, slits, score lines, cuts or other lines of separation 224 (FIG. 4) can be formed longitudinally along the length of the web of bag material.

As the perforated/cut web of bag material proceeds downstream from the cutting station 215, it will pass through an initial folding or tube forming station 230 in which the peripheral side edges of the now separated lanes or lines L of bag material will be progressively folded by folders 231 to form tubes or sleeves, as generally indicated in FIG. 4. The folders 231 further can act to help separate the web of bag material into its separate lanes or lines L along the lines of separation 224 formed by the vertical cutting edges 219 of the cutting roller 217. Each of the lines of bag material thereafter can be moved into engagement with a series of heat seal bars 235 for formation of the longitudinal seams 8 therealong.

After seaming, the lines of bag material can be fed about a series of rollers or guides 236, for forming the fold lines of the Bags, with the formation of such fold lines being controlled as discussed above with respect to the embodiment of FIG. 2, and wound about a storage roll 237 as shown in FIG. 4. This storage roll of seamed and perforated bag material can be transported or transferred to a separate multi-lane combining portion/line or machine 240 of the system 200 for application of the reinforcing strips 10 thereto. Alternatively, the lines of bag material could be fed directly into the combining portion 240.

As shown in FIG. 4, a roll 241 of a reinforcing strip stock material, such as a CCNK roll stock 242, which can be pre-printed with various graphics or labeling, will be fed along its initial path of travel 243 through a cutting station 244 for cutting of the reinforcing strip stock material 242 into individual blanks or strips 10. The cutting station 244 generally is shown as including a first or upper cutting roller 246 having a series of laterally extending cutting edges or blades 247, and a series of vertically extending or circumferential cutting edges or blades 248, which engage or bear against a lower compression or bearing roll 249 as the reinforcing strip stock material 242 passes therebetween. As a result, as indicated in FIG. 4, the reinforcing strip stock material generally is cut or segmented across its length and width to form individual blanks for the reinforcing strips 10, with the number of blanks formed across the reinforcing strip stock material generally corresponding to the number of lines L of bag material formed in the expanded web of bag material M'.

After cutting, the reinforcing strips 10 thereafter are passed through a downstream printing station 251, here illustrated as including a cold adhesive printer 252. The cold adhesive printer 252 generally can include a series of rotating drums 253, although a single drum also could be used, having print heads or areas 254 arranged in spaced series about the circumference of the drums. An adhesive supply roller 256, such as a kiss roller or similar adhesive applicator which supplies adhesive from a trough or other supply 257, is positioned adjacent/upstream from the cold adhesive printer for supplying adhesive to each of the print areas 254. As discussed with respect to the embodiments of FIGS. 2 and 3, the cold adhesive printer will apply adhesive materials A in a series of predetermined patterns or designs to the reinforcing strips 10, and although discrete lines of adhesive are illustrated for purposes of clarity, it will be understood that a variety of other, different patterns of adhesive materials generally can and will be applied to the reinforcing strips.

Once the adhesive material has been applied to the reinforcing strips, the reinforcing strips can be brought into registration with their corresponding Bags by the passage of the reinforcing strips into engagement with the Bags being conveyed about a vacuum drum 260. In the embodiment illustrated in FIG. 4, a supply roll 237' including a series of discrete lines of discrete bag material, can feed the lines L of bag material about a series of guide rollers 261 and between a series of upper and lower registration drive rolls 262A and 262B for feeding to a cutting station 265. The registration drive rolls generally can be driven or operated so as to control the flow or movement of the lines of bag material being fed to the cutting station 265 to ensure that the lines of bag materials are aligned with the rotary cutoff knives 266 of the cutting station to ensure proper cutting and separation of the Bags B.

As the Bags are cut by the cutting blades 267 of the rotary cutoff knife 266, they are conveyed by the vacuum drum into registration and engagement with the reinforcing strips passing therebelow. The bodies of the Bags B will be urged or pressed into adhesive contact with the adhesive materials applied to the reinforcing strips so as to affix the reinforcing strips thereto as the Bags and reinforcing strips move along their combined path of travel indicated by arrow 270. In this embodiment, the peripheral/side portions 13A/13B can remain free of adhesive at this point so as to enable the combined/attached Bags and reinforcing strips to be collected and stacked, as indicated at 271, for either storage or transfer to a Folder/Gluer line 275. Alternatively, the Folder/Gluer line 275 of the system 200 can be provided inline with the multi-lane combining machine section or portion 240.

Additionally, the reinforcing strip blanks can be scored, nicked, perforated or otherwise cut in a manner by the cutting station 244, whereby the blanks remain at least partially connected or linked. As a result, the blanks can be handled as a single or unitary sheet of blanks for application to the Bags to facilitate handling of the blanks, including after application of the Bags thereto. These sheets of reinforcing strips with the Bags attached can be stacked as work-in-progress stacks 271 and can be thus transported to the folder/gluer line 215 in connected sheets for ease of handling. Thereafter, the reinforcing strips can be separated by various means, either prior to feeding the attached reinforcing strips and Bags into the Folder/Gluer, or as part of the downstream folding and gluing operation.

The combined Bags and reinforcing strips generally can be fed from a magazine or stack 276 along a path of travel, as indicated by arrow 277, through the Folder/Gluer line for folding in the side portions 13A and 13B of the reinforcing strips 10 about the bodies of their attached Bags B to complete the formation of the Bags B. As illustrated in FIG. 4, an adhesive applicator 280, here shown as including a series of adhesive applicator nozzles 281, can apply an adhesive material to the side portions of the reinforcing strips and/or to the body portion of the Bags to which the reinforcing strips are applied. Thereafter, the Bags and reinforcing strips can continue along their path of travel 277 through or between a series of folders, which will progressively engage and fold the side portions 13A and 13B of the reinforcing strips upwardly and over the bodies of their Bags and into substantially flat, adhesive contact therewith. The application of the adhesive material to the side portions of the reinforcing strips will be controlled so as to apply a desired pattern as needed for providing sufficient amount of adhesive to adhere the side portions to the Bag body and each other as needed, while still providing for lock and fold zones or areas 19A/19B along which the sides of the Bags can be expanded as needed to open the Bags and maintain the Bags in an opened, stable configuration as shown in FIG. 1C.

After the side portions of each of the reinforcing strips have been folded and secured, the Bags then generally will be rotated or turned approximately 90° as indicated at turn section 283 in FIG. 4. This enables the bottom edge of each of the Bags to be presented for engagement and sealing by heat seal bars 286. After the bottom edge 7 of each of the Bags has been sealed, the Bags can be collected for cartoning and transport.

The foregoing description generally illustrates and describes various embodiments of the present invention. However, it will be understood by those skilled in the art that various changes can be made to the above-discussed construction without departing from the spirit and scope of the present invention as disclosed herein, and that it is further intended that all matter contained in the above description or shown in the accompanying drawings shall be interpreted as illustrative, and not in a limiting sense. Furthermore, the scope of the present disclosure shall be construed to cover various modifications, combinations, alterations, etc., of the above-described embodiments, which shall be considered to be within the scope of the present invention. Accordingly, various features and characteristics of the present invention as discussed herein may be selectively interchanged and applied to other illustrated and non-illustrated embodiments of the present invention.

The invention claimed is:

1. A method of manufacturing reinforced bags, comprising:
   - feeding a web of bag material along a path of travel;
   - folding the web of bag material to form a sleeve;
   - separating bags from the sleeve of bag material;
   - feeding a series of reinforcing elements along a path toward registration with the bags, each reinforcing element comprising a central body section, a first peripheral side portion foldably connected to the central body section, and a second peripheral side portion foldably connected to the central body section, wherein a first lock zone extends from a first fold line extending in the central body section to a second fold line extending in the first peripheral side portion, and a second lock zone extends from a third fold line extending in the central body section to a fourth fold line extending in the second peripheral side portion;
   - attaching the reinforcing elements of the series of reinforcing elements to the respective bags comprising:
     - applying a first adhesive material to the central body section of each of the reinforcing elements;
     - adhering the reinforcing elements to the respective bags with the first adhesive material by moving the reinforcing elements into adhesive contact with the bags, wherein the first adhesive material adheres the bags to the respective central body sections of the respective reinforcing elements;
     - applying a second adhesive material to the first peripheral side portion and the second peripheral side portion of each of the reinforcing elements after the moving the reinforcing elements into adhesive contact with the bags, the first lock zone and the second lock zone being generally free of the first adhesive material and the second adhesive material; and
     - adhering the reinforcing elements to the respective bags with the second adhesive material by folding the first peripheral side portion and the second peripheral side portion of each of the reinforcing elements into a position closed about the bags comprising moving the first peripheral side portion and the second peripheral side portion of each of the reinforcing elements into adhesive contact with the respective bags, wherein the second adhesive material adheres the bags to the first peripheral side portion and the second peripheral side portion of the respective reinforcing elements; and
   - at least partially sealing an end edge of each of the bags after the moving the reinforcing elements into adhesive contact with the bags.

2. The method of claim 1, wherein each of the bags has two open ends prior to the at least partially sealing the end edge of each of the bags.

3. The method of claim 1, further comprising rotating each of the bags and the reinforcing elements prior to the at least partially sealing the end edge of each of the bags to orient the respective bag so that the respective end edge is received by a bottom seaming station during the at least partially sealing the end edge of each of the bags.

4. The method of claim 1, wherein the at least partially sealing the end edge of each of the bags comprises moving the end edge between two seal bars of a bottom seaming station.

5. The method of claim 1, wherein applying the first adhesive material further comprises printing or spraying the first adhesive material on the reinforcing elements.

6. The method of claim 1, further comprising applying a compressive force to the sleeve of bag material to form side edges of the bags, with the compressive force being controlled to provide a desired gapping between plies of the bags.

7. The method of claim 1, wherein the separating the bags from the sleeve comprises engaging the sleeve with a rotary cutoff knife having cutting blades, the rotary cutoff knife cutting the sleeve with the cutting blades to form the bags.

8. The method of claim 7, further comprising receiving the bags on a vacuum drum from the rotary cutoff knife and moving the bags on the vacuum drum to the respective reinforcing elements.

9. The method of claim 1, wherein the feeding the web of bag material comprises feeding an expanded web of bag material and separating the expanded web of bag material into at least two lines of bag material.

10. The method of claim 9, wherein the feeding the series of reinforcing members along the path toward registration with the bags comprises feeding a stock material from a supply, and cutting and separating the series of reinforcing elements to form lines of reinforcing elements corresponding to the lines of bag material separated from the expanded web of bag material.

11. The method of claim 10, further comprising cutting the bags from the lines of bag material prior to moving the reinforcing elements into adhesive contact with the bags.

12. The method of claim 11, wherein the folding the web of bag material to form the sleeve comprises respectively folding each line of bag material of the at least two lines of bag material to respectively form at least two sleeves, and the separating the bags from the sleeve of bag material comprises separating the bags from the at least two sleeves.

13. The method of claim 12, wherein the feeding the series of reinforcing elements along the path comprising feeding at least two series of reinforcing elements along the path, and the moving the reinforcing elements into adhesive contact with the bags comprises moving two reinforcement elements into adhesive contact with respective bags substantially concurrently.

14. The method of claim 1, wherein the first peripheral side portion is foldably connected to the central body section along a fifth fold line extending in the first lock zone and the second peripheral side portion is foldably connected to the central body section along a sixth fold line extending in the second lock zone, and the folding the first peripheral side portion and the second peripheral side portion of each of the reinforcing elements into a position closed about the bags comprises folding the first peripheral side portion and the second peripheral side portion along the respective fifth fold line and sixth fold line, the fifth fold line and the sixth fold line each extending in a lateral direction of the respective reinforcing elements.

15. The method of claim 1, wherein the first adhesive material extends along each of the first fold line and the third fold line in the central body section, and the second adhesive material extends along each of the second fold line and the fourth fold line in the respective first peripheral side portion and second peripheral side portion.

16. The method of claim 15, wherein each of the first fold line, the second fold line, the third fold line, and the fourth fold line is at least partially curved.

17. The method of claim 1, wherein the reinforcing elements are in an unfolded blank configuration during the applying the second adhesive material to the first peripheral side portion and the second peripheral side portion of each of the reinforcing elements.

* * * * *